April 22, 1958     G. L. STINE     2,831,531
SINUOUS TYPE OF SPRING AND SEAT FORMED THEREWITH
Filed Jan. 29, 1952
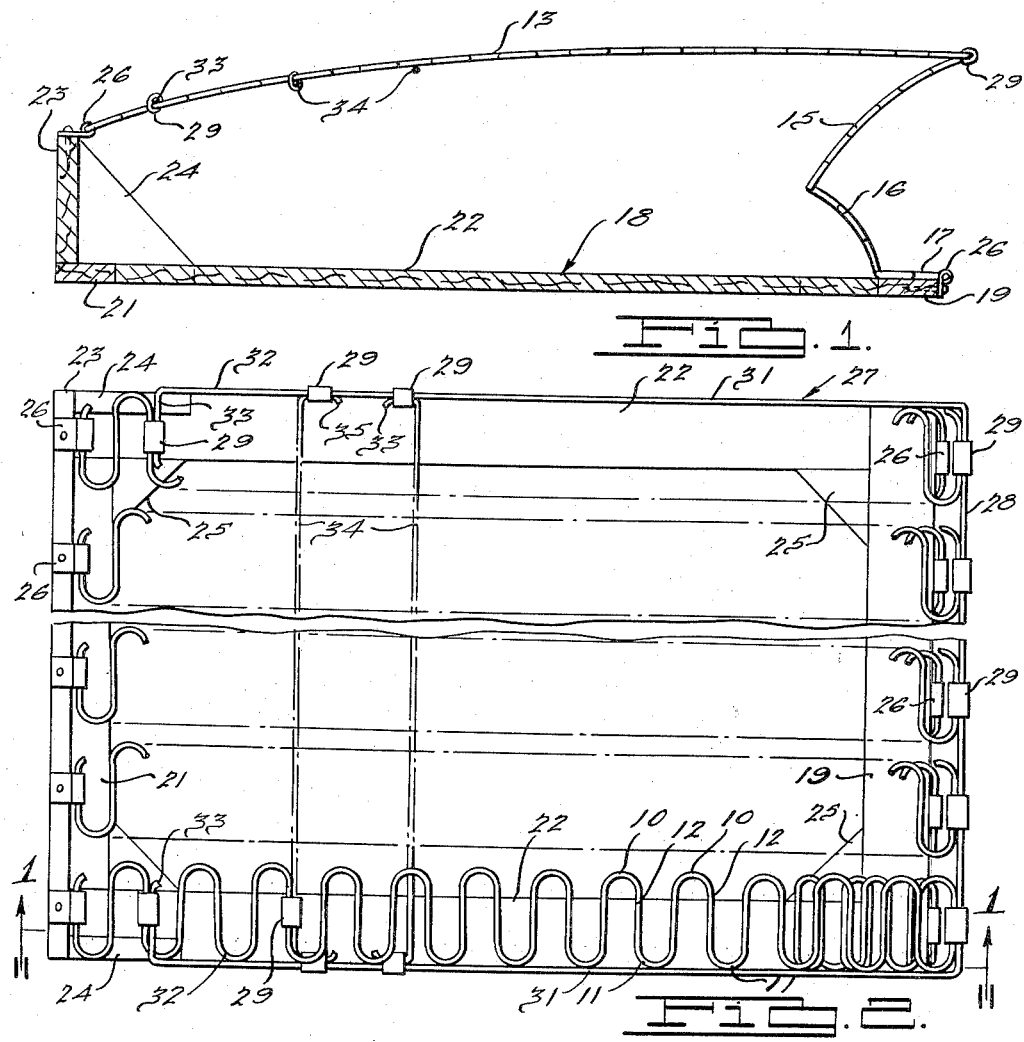
INVENTOR.
Glynn L. Stine.
BY
Harness, Dickey & Pierce
ATTORNEYS.

United States Patent Office 2,831,531
Patented Apr. 22, 1958

---

2,831,531

SINUOUS TYPE OF SPRING AND SEAT FORMED THEREWITH

Glynn L. Stine, Detroit, Mich., assignor to No-Sag Spring Company, Warren Township, Mich., a corporation of Michigan Application January 29, 1952, Serial No. 268,897

4 Claims. (Cl. 155—179)

This invention relates to spring constructions, and particularly to a sinuous type spring having a predetermined contour before and after mounting on a frame.

The spring is made of wire bent back and forth to have alternate, oppositely disposed loops joined by straight portions to form a length of spring strip which is arched on a small radius and which has one end thereof reversely bent and formed into the shape of a U which is outwardly presenting from the area encompassed by the arcuate portion which forms the load supporting portion of the strip. A plurality of spring strips are secured to a frame, with the U-shaped portion extended and attached to the front frame members. The end is pivoted to the front edge in a manner to permit the free arm of the U-shaped portion to rest upon its top surface and prevent the pivoting of the arm under the application of a downward load.

The rear end of the frame is preferably elevated and the rear ends of the load supporting portion of the spring strip are pivotally secured thereto. The load supporting portion of the spring strips are stretched when the rear ends are attached to remove most of the arch therein. The stretching occurs because the U-shaped portion of the strip is prevented from rocking rearwardly by the engagement of the free arm thereof with the frame. A U-shaped border wire is attached to the front edge of all of the spring strips and to the side spring strips near the rear supported ends thereof.

Accordingly, the main objects of the invention are: to provide a spring strip made from sinuously formed wire which is arched on a smal radius and having one end portion bent into U shape and disposed in the area encompassed by the arcuate portion so as to be presenting outwardly therefrom; to mount a plurality of the formed sinuous spring strips upon a frame, with the free end of the U-shaped portion resting upon the front frame member to prevent the rocking rearwardly of the end when the rear end of the spring is extended and secured to the rear end of the frame; to secure a plurality of assembled spring strips in unit relation by a U-shaped border wire having the web portion secured to the front end of the load supporting portion of the spring strips and the arm portions secured to the sidemost spring strips at a point spaced from the supported end thereof, and, in general, to provide a spring and an assembly thereof which is simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a sectional view of a frame, showing a spring element mounted thereon in side elevation;

Figure 2 is a plan view of the spring assembly illustrated in Fig. 1, and

Fig. 3 is a view of the spring element illustrated in Fig. 1 in its free state before being attached to the frame.

The sinuous spring strip of the present invention is made of wire bent back and forth to provide alternate, oppositely disposed loops 10 and 11 joined by straight portions 12. The spring strip thus formed is arched upon an arc of small radius, as illustrated in Fig. 3, forming a load supporting portion 13, on the front end of which a U-shaped portion 14 is reversely bent within the area of the arch and presenting outwardly therefrom. The seating portion is joined to a supporting portion 15 which is reversely arched and which is joined to a second supporting portion 16 in V-shaped relation therewith. A free arm portion 17 extends from the end of the second supporting portion 16, the portions 15, 16 and 17 forming the U-shaped, reversely bent portion of the spring strip.

Referring to Figs. 1 and 2, a frame 18 is illustrated, having a flat front member 19 and a rear member 21 spaced by side members 22. An upstanding member 23 is secured to the rear frame member 21, being secured to the side members by gusset plates 24. Blocks 25 may be provided at the corners of the front and rear frame members where they join with the side members.

A plurality of the spring strips are secured to the frame member by clips 26 which engage the straight portions at the end of the arms 17. The clips are secured to the front face of the frame member 19 in a manner to permit the arms 17 of the spring strips to rest upon the top flat face of the frame member. The endmost straight portion at the rear of the spring strip pivots in the eyes of the clips 26. The spring strips are drawn rearwardly to remove the major portion of the arc therefrom when the clips are nailed to the top of the upstanding frame member 23. This produces the proper contour to the load supporting portion 13 of the spring strips, as illustrated in Fig. 1, and provides a soft edge to the front of the load supporting portions of the strips due to the inwardly projecting supporting portions 15 and 16.

After the spring strips are assembled in this manner, a U-shaped border wire 27 has the front web portion 28 secured to the straight portions at the forward end of the load supporting portion 13 of the spring strips by suitable bands 29. The rearwardly extending arm portions 31 of the border wire project along the sidemost spring strips 32, and the inwardly projecting ends thereof are secured by the bands 29 to straight portions of the spring strips 32 which are spaced from the endmost straight portions secured in the clips 26.

Laterally disposed bracing wires 34 extend between the arms 31 near the rearward ends thereof, having end portions 35 which are secured by the bands 29 to the arm portions 31 of the border wire. The bracing wire 34 extends beneath the spring strips to cause them to deflect in unison therewith. It will be noted that the rearmost bracing wire 34 is secured to the straight portions of the spring strips by the bands 29.

A very durable spring assembly is provided by the spring strips when secured to the frame since the arm portions 17, while being pivoted to the frame, rest upon the frame in a manner to prevent the pivoting of the supporting portions 15 and 16 of the strips. Predetermined tension, however, is provided to the portions 15 and 16 when the load supporting portion 13 of the strip is drawn rearwardly and secured to the rear member 23 of the frame. Substantial depth is provided to the spring assembly in view of the supporting portions 15 and 16 at the front end and the upstanding frame member 23 at the rear end.

What is claimed is:

1. In a spring assembly, a base frame having front and rear members spaced by side members, an upstanding member on said rear member, sinuous spring strips made from wire bent back and forth to provide alternate oppositely disposed loops joined by straight portions, said strips having an arched portion for supporting a load and a V-shaped portion having an upwardly directed section and a shorter downwardly directed section extending from one end, the free end of the V-shaped portion containing at least two loops being bent at an angle so as to extend outwardly of the V portion, clips attaching the free end of the arched portion of the strips to the upstanding frame member, and additional clips pivotally securing the ends of the downwardly directed sections of the V-shaped portions to the front member of the frame to have the V-shaped portions supported against pivotal movement when said two loops bear against the face of the front frame member.

2. In a spring assembly, a base frame having a front and rear member spaced by side members, sinuous spring strips made from wire bent back and forth to provide alternate oppositely disposed loops joined by straight portions, each said strip having an arched portion for supporting a load and a V-shaped portion having an upwardly directed section and a shorter downwardly directed section connected to one end and extending within the area of the arched portion in a manner to be presenting outwardly therefrom, said supporting leg embodying at least two loops angularly disposed at the end of the downwardly directed section in outward extension thereof, means securing the rear end of the load supporting arched portion of the spring strip to the rear frame member, clips pivotally securing the ends of the downwardly directed sections of the V-shaped portions to the front member of the frame to have the V-shaped portions supported against pivotal movement when the said two loops bear against the face of the front frame member permitting the web and the V-shaped portion to be stressed when mounted on the frame so as to have the major portion of the arch of the load supporting portion removed therefrom.

3. A sinuous spring strip made of wire bent back and forth to have alternate oppositely disposed loops joined by straight portions, the main length of the strip forming the load bearing portion being disposed on an arc, one end of said load bearing portion having a section of the strip bent thereunder into a V-shaped support embodying an inwardly directed upper arm and an outwardly directed lower arm, the lower loops of which are disposed in angular relation to the other loops thereof so as to be substantially parallel to the forward portion of the load bearing portion of the strip when in free position and when secured on a frame.

4. A sinuous spring strip made of wire bent back and forth to have alternate oppositely disposed loops joined by straight portions, the main length of the strip forming the load bearing portion being disposed on an arc, one end of said load bearing portion having a section of the strip bent thereunder into a V-shaped support embodying an inwardly directed upper arm and a substantially shorter outwardly directed lower arm, at least two loops at the end of the lower arm being disposed in angular relation thereto in outward extension of the lower arm in parallel relation to the forward portion of the load bearing portion of the strip when in mounted and unmounted condition.

References Cited in the file of this patent

UNITED STATES PATENTS

| | | |
|---|---|---|
| 2,207,054 | Freund | July 9, 1940 |
| 2,341,015 | Blumensaadt et al. | Feb. 8, 1944 |
| 2,341,419 | Bank | Feb. 8, 1944 |
| 2,526,183 | Williams et al. | Oct. 17, 1950 |
| 2,631,029 | Wolofski | Mar. 10, 1953 |
| 2,660,227 | Laurie | Nov. 24, 1953 |
| 2,666,477 | Flint | Jan. 19, 1954 |

FOREIGN PATENTS

| | | |
|---|---|---|
| 206,149 | Switzerland | Oct. 16, 1939 |
| 667,953 | Great Britain | Mar. 12, 1952 |